United States Patent Office 2,877,196
Patented Mar. 10, 1959

2,877,196

COATING COMPOSITION CONTAINING WAX AND ETHYLENE-VINYL ACETATE COPOLYMER

Frederick P. Reding, Charleston, W. Va., assignor to Union Carbide Corporation, a corporation of New York No Drawing. Application May 2, 1956
Serial No. 582,086

6 Claims. (Cl. 260—28.5)

This invention relates to improved wax compositions suitable for coating paper, cloth and other articles, and more particularly to wax compositions containing a minor amount of an ethylene-vinyl acetate copolymer.

Petroleum derived waxes have long been used to coat paper, cloth, fibers and food products such as cheeses and meat carcasses to render them moisture vapor resistant. Such waxes, however, tend to crack and peel off the coated articles because of the low tensile strength and poor ductility of the unmodified waxes. These petroleum waxes are also known as paraffin wax and microcrystalline wax depending on the length of the carbon chain of the wax.

The tensile strength and ductility of petroleum waxes have been improved to some extent by the addition of small amounts of a normally solid polyethylene to the wax. While clear liquid solutions of polyethylene and petroleum wax can be obtained by heating and stirring a mixture of the two components at a temperature of at least about 120° C., nevertheless, when the mixture is cooled a major amount of the polyethylene tends to precipitate out. The amount of separation and the temperature at which it occurs is dependent upon the initial properties of the starting components. A fine dispersion of the polyethylene in the wax can be obtained by vigorously stirring the mixture until it has cooled to practically its freezing or solidification point. However, this finely dispersed polyethylene results in only a limited improvement in the tensile strength and ductility of the wax-polyethylene mixture. Also, the vigorous agitation tends to produce air bubbles in the liquid mixture and these interfere with, or prevent, the formation of continuous wax coatings or impregnations. If the rate of stirring is decreased then as the temperature of the wax-polyethylene mixture is lowered a point is reached at which one obtains two phases. These phases consist of a liquid phase of the petroleum wax containing a very small amount of dissolved polyethylene and a solid phase of polyethylene particles. Such two phase mixtures show little or no improvement over unmodified wax.

In preparing coating compositions of petroleum wax with polyethylene the two components are stirred and heated to at least about 120° C. to effect solution. As this solution is cooled slowly, at a rate of about 2° C. per minute, one observes a distinct incompatibility of the polyethylene in the petroleum wax when the temperature of the mixture is about 25° to 35° C. above the melting point of the petroleum wax; at this point the solution becomes cloudy. The specific temperature at which such a cloudy appearance is observed will hereinafter be referred to as the "cloud point temperature." Upon further cooling of the cloudy solution visible precipitation of solid polyethylene particles is observed, and eventually, in the absence of stirring, a two phase system of liquid paraffin wax and slushy polyethylene particles is obtained.

In wax impregnating or coating operations the temperature of the wax melt is maintained as close as possible to the freezing point of the petroleum wax in order to quickly set the coating, to avoid deterioration of the wax, to avoid decomposition of heat-sensitive materials being coated or impregnated, and to avoid unsealing of seams, as for example in paper milk cartons where the seams are generally bonded or sealed with low melting point thermoplastic adhesives such as polyvinyl acetate. Since such operating temperatures are in the region wherein precipitation or separation occurs the use of polyethylene-petroleum wax mixtures has been restricted despite their otherwise useful and desirable properties.

It has now been found that copolymers of ethylene and vinyl acetate are soluble in molten petroleum waxes and that such mixtures in the solid state have improved tensile strengths and ductility over mixtures of polyethylene and petroleum wax and over petroleum wax itself. It has also been found that these copolymers will remain in solution in the petroleum wax down to the temperature at which the petroleum wax itself solidifies.

The ethylene-vinyl acetate copolymers suitable for the purposes of this invention are those copolymers having a polymerized vinyl acetate content of from about 5% to about 25% by weight, preferably from about 15% to about 20% by weight.

Such copolymers can be prepared by copolymerizing a mixture of ethylene and vinyl acetate in the presence of a catalyst such as oxygen, or an organic peroxide such as t-butyl hydroperoxide, in a tubular reactor at pressures of from about 15,000 to about 30,000 p. s. i. g. and temperatures of from about 150° to about 250° C., and then separating the resultant copolymer from unreacted monomers by flashing off the unreacted monomers. By varying the conditions of pressure, temperature, catalyst concentration and vinyl acetate content in the monomer mixture one can obtain copolymers varying in melt index from about 0.5 to above about 1000.

The petroleum wax can be either microcrystalline or paraffin wax. The preferred microcrystalline or amorphous wax has a melting point of from about 60° to about 82° C. The preferred paraffin wax melts from about 50° to about 60° C. These waxes may contain up to about 0.5% mineral oil by weight without detriment to the final coating properties of the ethylene-vinyl acetate copolymer modified wax composition of this invention.

The ethylene-vinyl acetate copolymer modified petroleum wax compositions are prepared by dissolving from about 0.1 to about 20% by weight of the ethylene-vinyl acetate copolymer having a melt index of from about 0.5 to about 1000, preferably from about 100 to about 1000, in molten petroleum wax while stirring. Solution is accomplished at temperatures of from about 70° to about 175° C., preferably from about 140° to about 150° C. These copolymer modified wax compositions are homogeneous solutions which when cooled slowly at a rate of about 2° C. per minute show lower cloud points than are obtained when polyethylene is added to the petroleum wax.

The modified wax compositions of this invention also have increased tensile strengths and improved ductility over unmodified wax or polyethylene modified wax compositions. These properties are obtained when from about 0.1% to about 20% by weight of a copolymer of ethylene and vinyl acetate, having a vinyl acetate content of from about 5% to about 25% by weight and a melt index of from about 0.5 to about 1000, is dissolved in petroleum wax. For certain applications where some separation of copolymer can be tolerated amounts up to about 50% by weight can be added without adversely affecting the properties of the wax composition. However, if a non-separating wax composition is desired then an ethylene-vinyl acetate copolymer content of from about 0.1% to about 10% by weight is preferred.

The melt index is determined by the procedure of Hunter and Oakes, British Plastics 94 (March 1945); and the vinyl acetate content is determined by infrared analysis.

Example 1

A mixture consisting of 81.5% ethylene and 18.5% vinyl acetate by weight and containing from 40 to 45 p. p. m. oxygen as catalyst was compressed to 20,000 p. s. i. g. This was forced through a jacketed tubular reactor about 200 feet long having an inside diameter of ½ inch at a rate of about 20 pounds per hour at a reactor pressure of 20,000 p. s. i. g. and at a reactor temperature of about 180° C. At the end of the reaction tube the copolymer and unreacted monomers were blown into a reaction vessel, which varied in pressure from zero p. s. i. g. at the start of the run to about 1000 p. s. i. g. at the end of the run, wherein unreacted monomers were flashed off. Conversion to copolymer was 6.1% by weight, and the resin had a vinyl acetate content of 20% by weight and a melt index of 3.4. Two grams of the copolymer was dissolved in 98 grams of paraffin wax having a melting point of about 55° C. by stirring at 120° C. for about ½ hour.

Example 2

A copolymer was prepared as described in Example 1 using a monomer mixture containing 82.6% ethylene and 17.4% vinyl acetate by weight, and copolymerizing at 160° C. Conversion was 3.4% by weight, and the resin had a vinyl acetate content of 16.5% by weight and a melt index of 1.0. Two grams of this copolymer was dissolved in 98 grams of paraffin wax having a melting point of about 55° C. by stirring at 120° C. for about ½ hour.

Example 3

A copolymer was prepared as described in Example 1 using a monomer mixture containing 86.6% ethylene and 13.4% vinyl acetate by weight, and copolymerizing at 200° C. Conversion was 11.9% by weight, and the resin had a vinyl acetate content of 13.5% by weight and a melt index of 5.7. Two grams of this copolymer was dissolved in 98 grams of paraffin wax having a melting point of about 55° C. by stirring at 120° C. for about ½ hour.

Example 4

A copolymer was prepared in the equipment described in Example 1 using a monomer mixture containing 76% ethylene and 24% vinyl acetate by weight, and 25 p. p. m. t-butyl peroxide as catalyst. Copolymerization was carried out at a jacket temperature of 250° C. and at a reactor pressure of 30,000 p. s. i. g. The resin had a vinyl acetate content of 20% by weight ant a melt index of 440. Two grams of this copolymer was dissolved in 98 grams of paraffin wax having a melting point of about 55° C. by stirring at 120° C. for about ½ hour.

In the table below the properties of the wax-copolymer compositions are compared with paraffin wax alone, and with a paraffin wax composition (A) containing 2% by weight of a polyethylene polymer having a melt index of about 2 and a density at 25° C. of about 0.92.

| Sample | Cloud Point, °C. | Stiffness, p. s. i. at 25° C. | Elongation, percent at 25° C. | Vinyl acetate content, percent by weight |
|---|---|---|---|---|
| Pure paraffin | | 38,000 | 0.7 | |
| Composition A | 89 | 25,000 | 1.8 | 0 |
| Example 1 | 60 | 12,000 | 3.2 | 20.0 |
| Example 2 | 62 | 21,000 | 4.0 | 16.5 |
| Example 3 | 71 | 22,500 | 4.2 | 13.5 |
| Example 4 | 60 | 15,000 | 4.1 | 20.0 |

The data readily indicate that an increase of vinyl acetate content in the copolymer results in a lower cloud point and a lower stiffness in the paraffin wax-copolymer mixture. In addition the compositions of Example 1, 2 and 4 remained only slightly hazy from the cloud point down to the crystallization temperature of the paraffin wax itself, namely 55° C.

The decrease in stiffness and increase in percent elongation of the modified compositions indicate a more flexible product, and as a result more durable coatings can be obtained when applied to paper, cloth, fiber, or other articles.

What is claimed is:

1. A composition of matter comprising from about 99.9% to about 80% by weight of the composition of petroleum wax in admixture with from about 0.1% to about 20% by weight of a resin, said resin consisting of a copolymer of ethylene and vinyl acetate, said copolymer having a vinyl acetate content of from about 5% to about 25% by weight and said copolymer consisting of the copolymerization product of a mixture of ethylene and vinyl acetate.

2. A composition of matter comprising from about 99.9% to about 80% by weight of the composition of petroleum wax in admixture with from about 0.1% to about 20% by weight of a resin, said resin consisting of a copolymer of ethylene and vinyl acetate, said copolymer having a vinyl acetate content of from about 5% to about 25% by weight and a melt index of from about 0.5 to about 1000 and said copolymer consisting of the copolymerization product of a mixture of ethylene and vinyl acetate.

3. A composition of matter comprising from about 99.9% to about 80% by weight of the composition of petroleum wax in admixture with from about 0.1% to about 20% by weight of a resin, said resin consisting of a copolymer of ethylene and vinyl acetate, said copolymer having a vinyl acetate content of from about 15% to about 20% by weight and a melt index of from about 100 to about 1000 and said copolymer consisting of the copolymerization product of a mixture of ethylene and vinyl acetate.

4. A composition of matter comprising a homogeneous mixture of from about 99% to about 80% by weight of petroleum wax and from about 0.1% to about 20% by weight of the composition of a solid resin, said resin consisting of a copolymer of ethylene and vinyl acetate having a vinyl acetate content of at least about 10% by weight and said copolymer consisting of the copolymerization product of a mixture of ethylene and vinyl acetate.

5. A composition of matter comprising from about 99.9% to about 80% by weight of the composition of petroleum wax in admixture with from about 1% to about 10% by weight of a resin, said resin consisting of a copolymer of ethylene and vinyl acetate, said copolymer having a vinyl acetate content of from about 15% to about 20% by weight and a melt index of from about 1 to about 50 and said copolymer consisting of the copolymerization product of a mixture of ethylene and vinyl acetate.

6. A petroleum wax composition of improved tensile strength and ductility comprising 100 parts by weight of a petroleum wax containing homogeneously admixed therewith from about 0.1 to about 20 parts by weight of a solid resin, said resin consisting of a copolymer of ethylene and vinyl acetate having a vinyl acetate content of from about 5% to about 25% by weight and said copolymer consisting of the copolymerization product of a mixture of ethylene and vinyl acetate.

References Cited in the file of this patent

UNITED STATES PATENTS

| 2,406,039 | Roedel | Aug. 20, 1946 |
| 2,490,550 | Sermattei | Dec. 6, 1949 |

Dedication 2,877,196.—*Frederick P. Reding*, Charleston, W. Va. COATING COMPOSITION CONTAINING WAX AND ETHYLENE-VINYL ACETATE COPOLYMER. Patent dated Mar. 10, 1959. Dedication filed Nov. 18, 1964, by the assignee, *Union Carbide Corporation*.

Hereby dedicates to the public the remaining term of said patent.
[*Official Gazette December 22, 1964.*]